United States Patent
Jaeschke

[11] 3,770,087
[45] Nov. 6, 1973

[54] SPLINE CLEARANCE REDUCTION FOR COUPLINGS

[75] Inventor: Ralph L. Jaeschke, Kenosha, Wis.

[73] Assignee: Eaton Corporation, Cleveland, Ohio

[22] Filed: May 12, 1972

[21] Appl. No.: 252,889

[52] U.S. Cl............... 192/18 B, 192/55, 192/70.17, 188/73.5, 64/27 CT
[51] Int. Cl............................................. F16d 67/06
[58] Field of Search....................... 192/18 B, 70.19, 192/70.20, 70.17, 55

[56] References Cited
UNITED STATES PATENTS

| | | | |
|---|---|---|---|
| 1,518,604 | 12/1924 | Rosner | 192/70.2 |
| 1,461,573 | 7/1923 | Browne | 192/70.19 |
| 3,674,122 | 7/1972 | Buisker | 192/18 B |
| 1,467,732 | 9/1923 | Litle | 192/70.2 |
| 1,415,841 | 5/1922 | Seitz | 192/70.2 |
| 2,575,765 | 11/1951 | Nabstedt | 192/55 X |

FOREIGN PATENTS OR APPLICATIONS

| | | | |
|---|---|---|---|
| 892,763 | 1/1944 | France | 192/55 |

Primary Examiner—Benjamin W. Wyche
Attorney—Marvin L. Union

[57] ABSTRACT

An electromagnetic coupling includes a driving member, a driven splined shaft member, a clutch torque transmitting member having a splined opening therein for receiving the driven splined shaft member, and a brake torque transmitting member having a splined opening therein for receiving the driven splined shaft member. First and second friction surfaces are provided for engagement with the clutch torque transmitting member and the brake torque transmitting member respectively. When the clutch torque transmitting member engages with the first friction surface the driving member will drive the driven member and when the brake torque transmitting member engages with the second friction surface the driven member will be braked. Spring means is provided connected to the clutch and brake torque transmitting members for exerting a torque moment on the clutch torque transmitting member in one direction about the driven splined shaft and on the brake torque transmitting member in an opposite direction about the driven splined shaft. The spring means acts to preload the clutch and brake torque transmitting members to prevent excessive spline clearance between the splined openings in the brake and clutch torque transmitting members and the splined shaft. The elimination of excessive spline clearance by the spring means decreases spline wear as excessive spline clearance results in brinelling and premature failure of the coupling.

4 Claims, 4 Drawing Figures

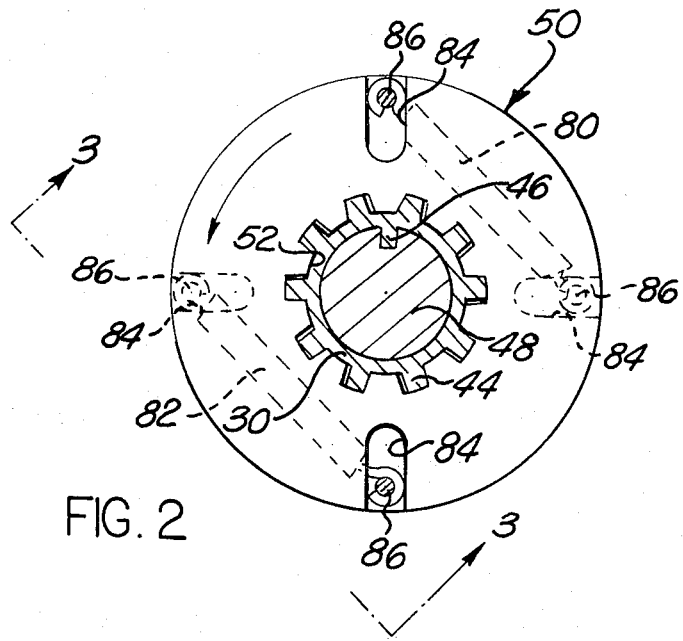
FIG. 2
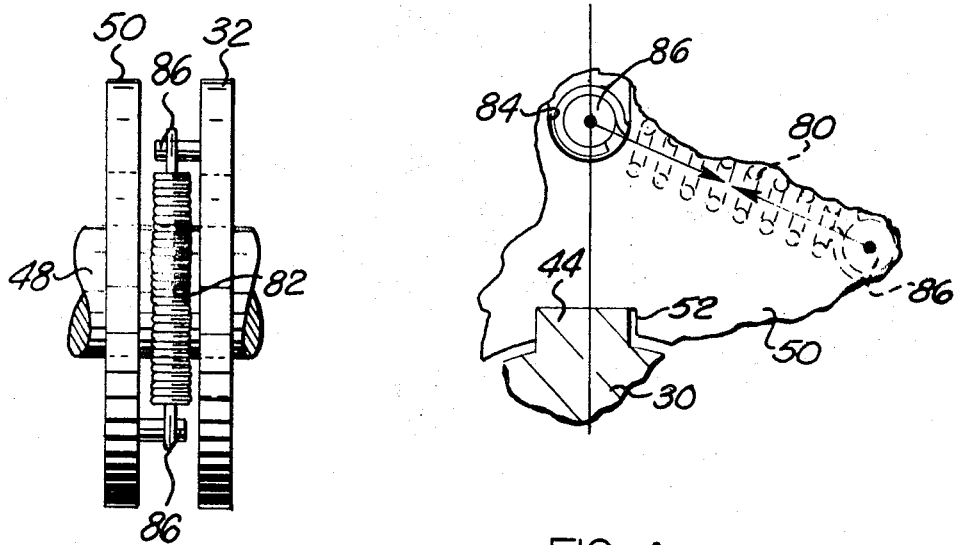
FIG. 3
FIG. 4

SPLINE CLEARANCE REDUCTION FOR COUPLINGS

BACKGROUND OF THE INVENTION

The present invention relates to an electromagnetic coupling and more particularly to a coupling having a torque transmitting member which is splined to a driving or driven member and which includes spring means for preloading the torque transmitting member to prevent excessive spline clearance between the torque transmitting member and the driving or driven member.

Known electromagnetic couplings utilize torque transmitting members which are splined to a driving or driven member. Problems due to excessive spline clearance arise upon repeated engagement and disengagement of the coupling. This is especially true in clutch-brake couplings which are utilized in computer printers for controlling the movement of paper through the printer as the printer prints. In such applications the clutch and brake are repeatedly alternately energized and deenergized as the paper is moved, stopped and printed on and then moved again so that another line may be printed. Since spline wear and position accuracy of clutch-brake couplings is determined upon spline clearance, excessive spline clearance effects an increase in spline wear and a decrease in position accuracy due to brinelling. This decrease in position accuracy is critical in computer printer applications due to the fact that the paper must be critically positioned each time a new line is to be printed. If the paper is not moved enough, the printer may overlap the lines of print and if the paper is moved too much then the time required to print is increased due to the undesirable increase in movement of the paper and the fact that the paper must be stopped before printing takes place otherwise smudging of the print occurs. One solution to this problem is to eliminate spline clearance. However, this is difficult to accomplish due to manufacturing inaccuracies between the spline components when the components are mass produced.

SUMMARY OF THE INVENTION

Accordingly, the present invention provides a new and improved electromagnetic coupling wherein a spring means is provided to preload the splined components of the coupling to eliminate excessive spline clearance and thereby increase the life and position accuracy of the coupling.

The present invention further provides a new and improved electromagnetic coupling including relatively rotatable driving and driven members one of which includes a splined portion, a torque transmitting member having a splined opening therein for receiving the splined portion of the one member, and actuating means for coupling the driving and driven members. The torque transmitting member acts to apply a torque moment in a first direction to the splined portion of the one member upon energization of the actuating means. A spring means is connected to the torque transmitting member and exerts a preloading force in the first direction between the torque transmitting member and the splined portion of the one member to eliminate excessive spline clearance between the splined portion of the one member and the splined opening of the torque transmitting member to thereby reduce wear between the splined components upon successive energization and deenergization of the actuating means.

The present invention also provides a new and improved electromagnetic coupling including rotable driving and driven shaft members one of which is a splined shaft member, a clutch torque transmitting member having a splined opening therein for receiving the splined shaft member and a brake torque transmitting member having a splined opening therein for receiving the splined shaft member. A first friction surface is provided for engaging with the clutch torque transmitting member. When the clutch torque transmitting member is engaged with the first friction surface, a driving relationship is established between the driving and driven members and when the clutch torque transmitting member is disengaged from the first friction surface relative rotation between the driving and driven members is provided. A second friction surface is provided for engagement with the brake torque transmitting member. When the brake torque transmitting member engages with the second friction surface, a braking force is established for retarding rotation of the driven shaft member. A spring means is interconnected between the brake and the clutch torque transmitting members and establishes a preloading force which tends to rotate the brake and the clutch torque transmitting members in opposite directions about the splined shaft member to eliminate excessive spline clearance between the splined openings of the brake and clutch torque transmitting members and the splined shaft. The preloading force established by the spring means eliminates excessive spline clearance to thereby reduce spline wear upon repeated engagement between the clutch torque transmitting member and the first friction surface and the brake torque transmitting member and the second friction surface.

DESCRIPTION OF THE DRAWINGS

FIG. 2 is a sectional view taken approximately along the line 2—2 of FIG. 1 more fully illustrating the spring means connected to the clutch and brake torque transmitting members;

FIG. 3 is a side view taken approximately along lines 3—3 of FIG. 2 more fully illustrating the spring means connected to the clutch and brake torque transmitting member; and FIG. 4 is an enlarged fragmentary schematic diagram illustrating the preloading effect of the spring means on the splined opening of the brake torque transmitting member and the splined shaft.

DESCRIPTION OF A PREFERRED EMBODIMENT

Figure 1:
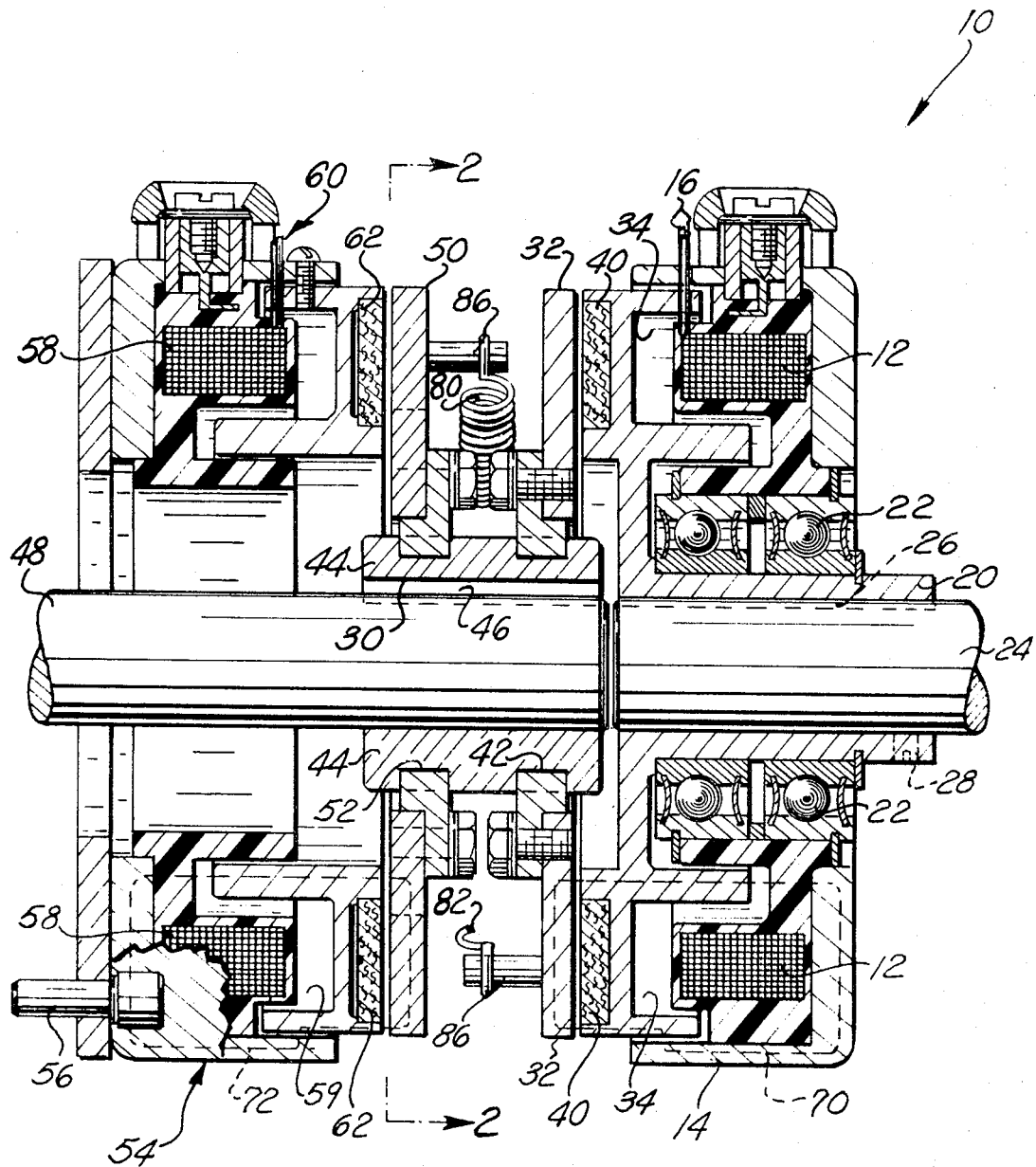
FIG. 1 is a cross sectional view illustrating the present invention as applied to a clutch-brake coupling.

The present invention provides a coupling having driving and driven members and means for moving the members into a torque transmitting relationship. The coupling of the present invention is adapted to substantially reduce excessive splined clearance between the splined components of the coupling by the provision of spring means which acts to preload the splined components and thereby increase the life and position accuracy of the coupling. While the present invention may be applied to couplings of a wide variety of constructions and designs, such as electromagnetic brakes and clutches, for illustrated purposes, the invention is described in connection with the clutch-brake coupling 10 illustrated in FIG. 1.

While many of the couplings incorporating the present invention may transmit torque in either direction, the coupling 10, illustrated in FIG. 1, is described as having a driving and a driven member. It should be understood, however, that the driving and driven member may be reversed for many of the other couplings with which the present invention may be associated. The coupling 10 includes a driving member 20 and a driven member 30, and means for establishing a driving torque transmitting relationship between the members 20 and 30. The means for establishing the driving relationship between the members 20 and 30 includes an electromagnetic coil 12 supported in an annular recess 34 in a stationary housing 14. The stationary housing 14 has lead wires 16 passing therethrough and adapted to receive an electrical potential thereon to energize the electromagnetic coil 12. The housing 14 is stationary with respect to the driving member 20 and bearings 22 are interposed between the housing 14 and the driving member 20 to enable the driving member 20 to rotate relative to the housing 14.

The driving member 20 is non-rotably attached to an input or driving shaft 24 by spline means such as the key 26 and set screws generally indicated at 28. It should be noted that the set screw 28 restrains relative movement of the driving shaft 24 and driving member 20 in an axial direction, while the key 26 restrains the driving member 20 from rotating relative to the driving shaft 24. The driving shaft 24 is adapted to transmit power to the driving member 20 such that power may be supplied to the driven member 30 when the electromagnetic coil 12 is actuated to establish a torque transmitting relationship between the driving member 20 and the driven member 30.

The driving member 20 has a torque transmitting surface 40 which is annular in configuration and which is supported in an annular recess in the driving member 20 for rotation therewith. A torque transmitting member 32 is attached to the driven member 30 for rotation therewith and is adapted to engage with the torque transmitting surface 40 of the driving member 20 when the coil 12 is actuated.

The driven member 30 includes a plurality of splines 44 on the outer circumference thereof which are adapted to engage with a splined opening 42 disposed in the torque transmitting member 32, to operatively connect the torque transmitting member 32 with the driven member 30. The driven member 30 is adapted to receive a driven shaft 48 therein. To this end, the driven member 30 includes a key 46 which is adapted to engage with a keyway located in the driven shaft 48 so that rotation of the driven member 30 effects rotation of the driven shaft 48 therewith in a well known manner. The torque transmitting member 32 operates as a clutch torque transmitting member in that engagement of the torque transmitting member 32 with the torque transmitting surface 40 of the driving member 20 effects rotation of the driven member 30 and the driven shaft 48.

A second torque transmitting member 50 is operatively associated with the driven member 30. The second torque transmitting member 50 operates as a brake torque transmitting member and includes a splined opening 52 therein which is adapted to receive and engage with the splines 44 disposed on the outer circumference of the driven member 30. A brake housing 54 is disposed adjacent to the brake torque transmitting member 50. The brake housing 54 is secured to a suitable rigid structure, not illustrated, by means of the bolts 56 so as to be nonrotatably supported. The brake housing 54 includes an annular coil 58 supported in an annular chamber 59. A pair of leads 60 are provided for connecting the coil 58 to a suitable supply of electrical current to energize the coil 58.

A torque transmitting surface 62 having an annular configuration is located in an annular recess disposed in the brake housing 54. The annular torque transmitting surface 62 is operable to engage with the brake torque transmitting member 50 to effectively brake the rotation of the driven member 30 and the driven shaft 48 connected thereto.

The clutch torque transmitting member 32 is normally disposed in a spaced apart relationship to the torque transmitting surface 40 disposed on the housing 14 and the brake torque transmitting surface 50 is normally disposed in a spaced apart relationship relative to the torque transmitting surface 62 disposed on the housing 54. When the coil 12 is energized, a flux path 70 is established from the coil 12, through the housing 14, through the driving member 20, through the torque transmitting member 32, through the driving member 20 and back through the housing 14 to the coil 12. The flux path 70 established by energization of coil 12 causes the torque transmitting member 32 to slide along the splines 44 of the driven member 30 to bring the torque transmitting member 32 into engagement with the torque transmitting surface 40. Engagement of the torque transmitting member 32 with the torque transmitting surface 40 effects rotation of the driven member 30 and the driven shaft 48 in response to rotation of the driving member 20 and the torque transmitting surface 40 therewith.

Energization of the coil 58 effects the establishment of a flux path 72 which runs from the coil 58, through the housing 54, through the torque transmitting member 50, and back through the housing 54 to the coil 58. The energization of the coil 58 and the establishment of the flux path 72 effects engagement of the brake torque transmitting member 50 with the torque transmitting surface 62 of the brake housing 54. Engagement of the brake torque transmitting surface 50 with the stationary torque transmitting surface 62 effects braking of the driven member 30 and the driven shaft member 48 attached thereto in a well known manner.

The coupling 10 cannot be activated as a brake and a clutch simultaneously. This is insured by the electrical connection, not illustrated, of the coils 12 and 58, which prevents simultaneous energization of coils 12 and 58. When the clutch coil 12 is energized, the clutch torque transmitting member 32 will engage with the torque transmitting surface 40 and rotation of the driven member 30 will be effected. At the same time the brake torque transmitting member 50 will be spaced apart from the torque transmitting surface 62. When the brake coil 58 is energized, the coil 12 will be deenergized and the brake torque transmitting member 50 will move into engagement with the torque transmitting surface 62 to brake rotation of the driven member 30. At the same time the clutch torque transmitting member 32 will be in a spaced apart relationship relative to the torque transmitting surface 40. In this manner, the clutch-brake coupling 10 can successively have the coils 12 and 58 energized to successively drive the driven member 30 and brake the driven member 30. Moreover, the electrical interconnection of the clutch coil 12 and the brake coil 58 insures that the clutch torque transmitting member 32 cannot engage with the torque transmitting surface 40 while the brake torque transmitting member 50 engages with the torque transmitting surface 62.

As more fully illustrated in FIGS. 2 and 3, spring means, in the form of spring members 80 and 82, is provided for interconnecting the clutch torque transmitting member 32 and the brake torque transmitting member 50. The springs 80 and 82 act to exert a torque moment on the brake torque transmitting member 50 and the cltuch torque transmitting member 32 in opposite directions about the driven member 30. The torque moment exerted on the clutch torque transmitting member 32 and the brake torque transmitting member 50 is operable to preload the torque transmitting members 32 and 50 to eliminate excessive spline clearance between the splines 44 of the driven member 30 and the splined openings 42 and 52 of the torque transmitting members 32 and 50 respectively.

The clutch torque transmitting member 32 and the brake torque transmitting member 50 include a plurality of radially extending slots 84 which extend inwardly from the outer circumference thereof. Each of the slots 84 is adapted to receive a pin 86 which is suitably affixed therein, and which provides a means for attaching the springs 80 and 82 to the clutch and brake torque transmitting members 32 and 50. As is illustrated in FIG. 2, there are two slots 84 which are disposed in diametrically opposite portions of each of the clutch and brake torque transmitting members 32 and 50 respectively. The slots 84 disposed in the clutch torque transmitting member 32 are spaced 90° from the slots 84 disposed in the brake torque transmitting member 50. The spring 80 has one end connected to one of the pins 86 attached to the clutch torque transmitting member 32 and the other end connected to one of the pins 86 attached to the brake torque transmitting member 50. The spring 82 has one end connected to one of the pins 86 connected to the brake torque transmitting member 50 and has its opposite end connected to one of the pins 86 connected to the clutch torque transmitting member 32. In this manner, the springs 80 and 82 exert a torque moment on the clutch and brake torque transmitting members 32 and 50. The pins 86 which extend from the torque transmitting members 32 and 50 enable the springs 80 and 82 to exert a straight line force between the pins 86 so that a torque moment is exerted on each of the torque transmitting members 32 and 50.

The torque moment which is exerted on the brake torque transmitting member 50 will be in one direction relative to the splines 44 of the driven member 30 and in an opposite direction for the brake torque transmitting member 50. This is due to the fact that the spring force is between the circumference of the clutch torque transmitting member 32 and the circumference of the brake torque transmitting member 50. Since the torque moment is in opposite directions, i.e., one direction for the clutch torque transmitting member 32 and the other direction for the brake torque transmitting member 50, the appropriate sides of the splined segments 44 associated with the torque transmitting forces exerted on each of the torque transmitting members 32 and 50 are in contact with the appropriate sides of the splines of the splined openings of the torque transmitting members 32 and 50. It should be appreciated that the clutch torque transmitting member 32 will exert a force in a first direction on the splines 44 when the clutch torque transmitting member 32 engages with the torque transmitting surface 40 and the brake torque transmitting member 50 will exert a force in a second direction opposite to the first direction on the splines 44 of the driven member 30 when the brake torque transmitting member 50 engages with the torque transmitting surface 62. Thus, since the torque moments applied by the springs 80 and 82 on the clutch and brake torque transmitting members 32 and 50 are in opposite directions, and the directions coincide with the direction of the forces normally exerted by the torque transmitting members 32 and 50 when they are engaged with their associated torque transmitting surfaces, the appropriate splined segments of the splined openings of the torque transmitting members and the splined driven member 30 will be preloaded into contact so that the excessive spline clearance therebetween is eliminated.

The elimination of the spline clearance is more fully illustrated in FIG. 4 which discloses a partial section of the brake torque transmitting member 50 and the splines 44 of the driven member 30. In FIg. 4 it can be seen that one side of the spline 44 is preloaded into engagement with the splined portion 52 of the brake torque transmitting member 50. The side of the splines 44 which is in engagement with the splined portion 52 of the brake torque transmitting member 32 is the side upon which the brake torque transmitting member 50 will normally exert a force on the splines 44 when the torque transmitting member 50 engages with the torque transmitting surface 62. To this end, the spring members 80 and 82 act to establish a torque moment which preloads the brake torque transmitting member 50 so that the sides of the splines 44 which are in engagement with the splined portion 52 of the brake torque transmitting member 50 coincides with the side of the splines 44 which engage with the splined opening 52 of the brake torque transmitting member 50 when the torque transmitting member 50 engages with the torque transmitting surface 62 to thereby eliminate brinelling. The brinelling normally occurs when the clutch or brake torque transmitting member engages with its associated torque transmitting surface to exert a driving force on the driven member 30. The driving force may either be a force tending to rotate the driven member 30 such as when the coil 12 is energized or brake the driven member 30 such as when the coil 58 is energized. It should be apparent that if there is excessive spline clearance between the splines 44 and the splined openings 42 or 52 of the clutch or brake torque transmitting members 32 and 50, respectively, when the coil associated with the torque transmitting member is energized the splined portion of the torque transmitting member will initially bang into the splines 44 of the driven member 30 due to the excessive spline clearance therebetween. This initial engagement of the splined openings of the torque transmitting members 32 and 50 with splines 44 of the driven member 30 will cause wear of the splined portion and the splines 44 to effect brinelling.

The present invention is especially adapted for use with computer printers utilizing clutch-brake couplings wherein the clutch-brake couplings control the movement of the paper through the printers. In such applications, the clutch-brake couplings are utilized to move the paper, stop the paper to enable it to be printed on, and then move the paper to a further position so that another line may be printed by the printer. In such applications the clutch coil is energized and deenergized and then the brake coil is energized and then deenergized. This sequential energization of the clutch and brake coils is repeated as the printer is used. Since spline wear and position accuracy of the coupling is determined by the spline clearance, excessive spline clearance results in a rapidly worn spline and a decrease in position accuracy due to brinelling. The present invention utilizing spring means to apply a preloading torque moment to the clutch and brake torque transmitting members 32 and 50 eliminates excessive spline clearance to increase the life and position accuracy of the coupling. It should be apparent that this is a great improvement in the art due to the fact that the accuracy and life of the clutch-brake coupling is increased without the necessity of matching the tolerances between the spline components of the couplings. Matching tolerances between the spline components of the couplings is an exceedingly costly endeavor when the couplings are mass produced. However, by preloading the clutch and brake torque transmitting members through the use of spring means this problem is eliminated.

While the present invention has been illustrated in conjunction with a clutch-brake coupling the present invention could be utilized in many other different types of couplings which includes splined torque transmitting components. For example, the present invention could be utilized in either a brake or a clutch coupling such as the one disclosed in U. S. patent application Ser. No. 838,523. In such a system spring means would be utilized to bias the clutch torque transmitting member relative to the splined driven shaft. Moreover, the present invention could be utilized in a coupling that acts as ajusto-gap system such as illustrated in U.S. Pat. No. Re. 25,516 wherein the gap between the torque transmitting member and the torque transmitting surface remains substantially constant when the coil is deenergized. In such a system a dummy plate located on the splines behind the clutch plate would be utilized. A spring would be arranged in a circumferential manner that would tend to hold the clutch plate and the dummy plate in position. A pin would connect the two plates to control the gap. The pin would have a head going through the dummy plate arranged with the spring between the head of the pin and the dummy plate. The pin would be fastened to the splined clutch plate and as the clutch plate is attracted to the field member and was wearing it would drag the dummy plate with it. The spring and the pin would restrict the movement of the armature plate away from the torque transmitting surface when the clutch field was deenergized. It should be further apparent that while coil springs have been utilized between two members disposed on the splined driven member the present invention could utilize many different types of springs such as leaf spring, spring wire, etc. Moreover, while conventional splines have been disclosed on the driven member other spline means could be utilized such as a key and keyway which would come in the definition of splines in terms of the present invention.

From the foregoing, it should be apparent that a new and improved coupling has been provided. The coupling includes a driven and a driving member and a pair of torque transmitting members which are mounted on one of the driving and driven members. The pair of torque transmitting members each includes splined openings therein which are adapted to receive a splined portion of the driving or driven member with which the torque transmitting members are associated. Spring means is provided interconnecting the torque transmitting members and acts to apply a torque moment about the spline portion of the driven or driving member to eliminate excessive spline clearance between the splined member and the splined portions of the torque transmitting members. The spring means acts to preload the members to eliminate excessive spline clearance and thereby increase the life and accuracy of the coupling.

I claim:

1. An electromagnetic coupling comprising rotatable driving and driven shaft members, one of said shaft members being a splined shaft, a clutch torque transmitting member having a splined opening therein for receiving said one splined shaft member, a brake torque transmitting member having a splined opening therein for receiving said one splined shaft member, a first friction surface connected to the other of said shaft members for rotation therewith, said clutch torque transmitting member and said first friction surface having an engaged position establishing a driving relationship between said driving and driven shaft members and a disengaged position permitting relative rotation between said driving and driven shaft members, a second friction surface, said brake torque transmitting member and said second friction surface having an engaged position establishing a braking force for retarding rotation of said driven shaft member and a disengaged position permitting rotation of said driven shaft member, and spring means connected between said clutch torque transmitting member and said brake torque transmitting member for establishing a preloading force tending to rotate said clutch torque transmitting member in a first direction and said brake torque transmitting member in a second direction opposite said first direction about said one splined shaft member to urge one side of said splined openings of said clutch torque transmitting member and an opposite side of said splined openings of said brake torque transmitting member into tight engagement with said one shaft member to eliminate excessive spline clearance between said splined openings of said clutch and brake torque transmitting members and said one splined shaft member.

2. An electromagnetic coupling as defined in claim 1 wherein said spring means comprises a coil spring connected between said brake and clutch torque transmitting members to preload said brake and clutch torque transmitting members in opposite directions.

3. An electromagnetic coupling comprising rotatable driving and driven shaft members, one of said shaft members being a splined shaft, a clutch torque transmitting member having a splined opening therein for receiving said one splined shaft member, a brake torque transmitting member having a splined opening therein for receiving said one splined shaft member, a first friction surface connected to the other of said shaft members for rotation therewith, said clutch torque transmitting member and said first friction surface having an engaged position establishing a driving relationship between said driving and driven shaft members and a disengaged position permitting relative rotation between said driving and driven shaft members, a second friction surface, said brake torque transmitting member and said second friction surface having an engaged position establishing a braking force for retarding rotation of said driven shaft member and a disengaged position permitting rotation of said driven shaft member, spring means connected to said clutch torque transmitting member and said brake torque transmitting member for establishing a preloading force tending to rotate said clutch torque transmitting member and said brake torque transmitting member in opposite directions about said one splined shaft member to urge said splined openings of said clutch and brake torque transmitting members into tight engagement with said one shaft member, said spring means exerting said force to eliminate excessive spline clearance between said splined openings of said clutch and brake torque transmitting members and said one splined shaft member to reduce wear between said splined portions of said torque transmitting members and said one splined shaft member upon repeated engagement between said clutch torque transmitting member and said friction surface and said brake torque transmitting member and said second friction surface, and said clutch torque transmitting member includes first and second pin members attached thereto in a spaced apart relationship, said brake torque transmitting member includes third and fourth pin members attached thereto in a spaced apart relationship, and said spring means includes a first spring member attached to said first and third pin members and a second spring member attached to said second and fourth pin members, said spring members and pin members cooperating to transfer the forces of said spring to said clutch and brake torque transmitting members to establish said torque moments thereon to preload said clutch and torque transmitting members in opposite directions about said one splined shaft member.

4. An electromagnetic coupling as defined in claim 3 wherein said first and second spring members comprise coil springs.

* * * * *